(12) United States Patent
Gross

(10) Patent No.: US 6,416,325 B2
(45) Date of Patent: Jul. 9, 2002

(54) GENEALOGICAL ANALYSIS TOOL

(76) Inventor: Jeffrey J. Gross, 600 Joshua Ct., Naperville, IL (US) 60540

( * ) Notice: Subject to any disclaimer, the term of this patent is extended or adjusted under 35 U.S.C. 154(b) by 0 days.

(21) Appl. No.: 09/832,596

(22) Filed: Apr. 11, 2001

Related U.S. Application Data

(60) Provisional application No. 60/197,302, filed on Apr. 14, 2000.

(51) Int. Cl.7 .......................... G09B 19/00; G09B 25/00
(52) U.S. Cl. ....................................... 434/154; 434/365
(58) Field of Search ................. 434/154, 211, 434/219, 276, 365, 367, 428, 430

(56) References Cited

U.S. PATENT DOCUMENTS

| | | | | |
|---|---|---|---|---|
| 4,332,565 A | * | 6/1982 | Mialet | 434/118 |
| 4,472,146 A | * | 9/1984 | Wiessbrod | 434/365 |
| 4,865,548 A | | 9/1989 | Snyder | 434/154 |
| 5,989,034 A | * | 11/1999 | Ninomiya et al. | 434/107 |

* cited by examiner

*Primary Examiner*—John Edmund Rovnak
(74) *Attorney, Agent, or Firm*—Clifford Kraft

(57) ABSTRACT

A computer program and method for displaying a family tree in 3 dimensions. A family space contains person objects representing members of a family. Data can be entered on family members by hand or read in from a database. Person objects are connected to other person objects to represent family relationships. Different axes in the family space can represent different relationships. One axis can represent siblingship, another can represent parent/child, and another can represent marriage or father/mother relationships. The space, or parts of it, can be displayed on an output device. A set of commands allows rotations, translations, zooming, etc. Selecting a particular person object can bring up historical information concerning that person and possibly a visual representation of that person.

20 Claims, 4 Drawing Sheets

GENEALOGICAL ANALYSIS TOOL

This application is based on, and claims priority from, U.S. Provisional Patent Application Ser. No. 60/197,302 filed Apr. 14, 2000 and incorporates it by reference.

BACKGROUND

1. Field of the Invention

This invention relates generally to the field of genealogy and more particularly to an automated way of visualizing a family using three-dimensional relationships.

2. Description of Related Art

Prior art methods of visualizing a family or family tree have included charts, diagrams, flow charts, and solid representations of family relationships. A family tree is a logical structure that shows the relationships between family members. Generally, children are shown lower in the tree than parents, and siblings are shown at the same level as each other with connections back to parents. Spouses are shown together or at the same level in a tree.

Some prior art methods have attempted to characterize a family tree in two dimensions. However, in two dimensions, it is difficult to establish or understand the way two complete trees join together in each marriage. Also, sometimes spouses die or remarry at a certain level in the tree creating half-siblings and relationships that are almost impossible to visualize in two dimensions. Three dimensions seems to be a better representation space. Snyder in U.S. Pat. No. 4,865,548 teaches a plastic three dimensional representation of a family tree. Here, planes arranged vertically allow pieces resembling chess pieces to represent family members, while strings represent ties between parents and children. However, this method is severely limited since once set up, it is very difficult to change. Also, complications in families such as deaths and remarriages are difficult to represent. Also, because of the finite size of a physical model and limitations on the possible number of planes, it is very difficult to represent large families.

What is badly needed is a system for taking pre-entered data from a genealogical data base such as GEDCOM, or any other database, or hand entered data, reading it into a processor, and then displaying it in a manner chosen according to several of many possible parameters.

SUMMARY OF THE INVENTION

The present invention relates to a system and tool for graphically displaying genealogical relationships. The tool can be used for any family since the user can simply read in pre-entered data from an existing genealogical data base. The tool can optionally be configured to enter data in real time. The tool allows presentation of the data in three dimensions and according to various parameters chosen and changed at will by the user.

The family tree in the present invention is composed of a family space and objects that represent persons, and a line or lines, that connect one person object to other person objects. The family space is simply a set containing persons (represented by person objects). Arbitrarily, the X axis (and associated X direction) can be chosen to represent siblings of a chosen family. The Y axis (and associated Y direction) can be chosen to represent generations in the family with the up direction possibly representing parents and the down direction representing children. The Z axis (and associated Z direction) can represent marriages, spouses, biological parent, adoptive parent, or other adult relationships. The choice of designators X, Y, and Z should no way imply the use of a Cartesian coordinate system; any convenient coordinate system is within the scope of the present invention including curvilinear coordinate systems and non-linear coordinate systems. However, the preferred coordinate system for displaying a family space is a Cartesian system. Therefore, X, Y, and Z will be used as designators for the coordinates of any system that is being used. It should be understood that even when a Cartesian coordinate system is used, the X axis does not necessarily have to be horizontal, and could be vertical or any other direction, and the Y axis does not have to be vertical, but could be horizontal or any other direction. Likewise, the Z axis could be any direction.

The person objects can be represented in a display by geometric shapes such as rectangles, triangles or other two dimensional shapes or cubes, spheres or other three dimensional shapes. Lines connecting person objects can represent relationships between the persons. For example, a line in the X direction can represent a sibling relationship; a line in the Y direction can indicate a parent/child relationship; and a line in the Z direction can indicate a marriage, biological parent, or other adult relationship. Children born out of wedlock can also be shown in this representation. The total representation can be moved (translated), zoomed larger or smaller, or rotated along or about any axis by the user to better view relationships.

It should be clearly understood that the word "marriage" used in context with the present invention is much broader than simply civil marriage or a marriage performed by clergy. The term marriage is defined to mean any relationship between two or more people that could procreate, foster, raise, care for, or otherwise parent, produce, or raise children, or any such relationship even where there are no children. This includes, but is not limited to, normal civil marriage, religious marriage, homosexual marriage, living together by people of opposite or same sex, divorced people, separated people, menage a trois, communal raising of children, parenting cooperatives, and any other bonding relation between two or more people. The relationship parents/children is any relation between one or more adults and one or more children, including by not limited to, normal parents, half-parents, adopted full or half parents, foster parents, and any other relationship for raising children.

A particular display of a chosen family space can be set up by choosing a person who is the starting point of the chart. Various types of charts can be selected including ancestral, ancestral/descendent, bloodline, and many other types of family relationships. The user can choose the number of generations before (above) and after (below) he or she wishes to see. The user can also choose the number and type of adult relationships to be displayed. A person object can display information about the person including history, interesting facts, and even photos or representations of faces or entire persons. In addition, a person object can be selected (by marking, selecting, clicking or double clicking in one embodiment of the present invention) to bring up a more comprehensive display of information about that person. The exact shapes of person objects, connection lines, backgrounds, foregrounds, and colors are arbitrary and selectable by the user. Any shapes, types or styles of connection lines, backgrounds, foregrounds, or colors are within the scope of the present invention.

The user can choose the type of symbol or object used to represent a particular person as well as color and texture of relationship lines and objects. The user can choose selected information about a person to display such as birth date. An image of the person can optionally be made to appear on the person object.

The user can choose various options to govern the Z or third axis in relation to children such as a maternal line (religions such as Judaism favor this), paternal (surname lineage), no link to father or mother, or adoptive (to show a child with adoptive parents first, with an alternative relationship to birth parents). The user can make the display cleaner (easier to view) by suppressing any information about an object or only showing minimal information such as name. Real time interaction with the display can be accomplished by using various keyboard keys (in a computer embodiment with a keyboard) to move the chart up or down, toward or away, or to rotate around one of the three axes, or choose one of several predefined view points. A mouse device can be also used to change the angle of the point of view (camera) looking at the chart. A joystick could also optionally be used to control the movement of the chart. A virtual reality glove could be used to control movement through the chart. Any combination of keyboard, hot-key, mouse, joystick, virtual reality glove, or any other control device existing now or invented later, is within the scope of the present invention.

It is also possible with the present invention to allow automatic rotation of the graph at a predetermined or adjustable rate. It is possible to allow the graph to be built automatically person by person with a predetermined or selected delay before each step in the building. This feature helps the user to visualize the family as it evolves in time. This person by person building can be applied to any relationships or any axis.

It is also possible to allow the user to peal off layers and make them disappear from the representation for easier viewing. It is possible to make person objects become transparent so that objects behind them can be viewed.

The invention allows various beneficial results including the ability to see cousins from all or some of a family at the same level, the ability to see how siblings of multiple families compare in size and gender, the ability to compare the number of generations in each pedigree line, and the ability to see the number of adult relationships each sibling or generation have.

The present invention also includes the optional feature of being able to present a slide-show of the development of a certain line in a family space. In addition, this slide-show or time-evolving version can be used as a computer screen saver.

DESCRIPTION OF THE INVENTION

Figure 1:
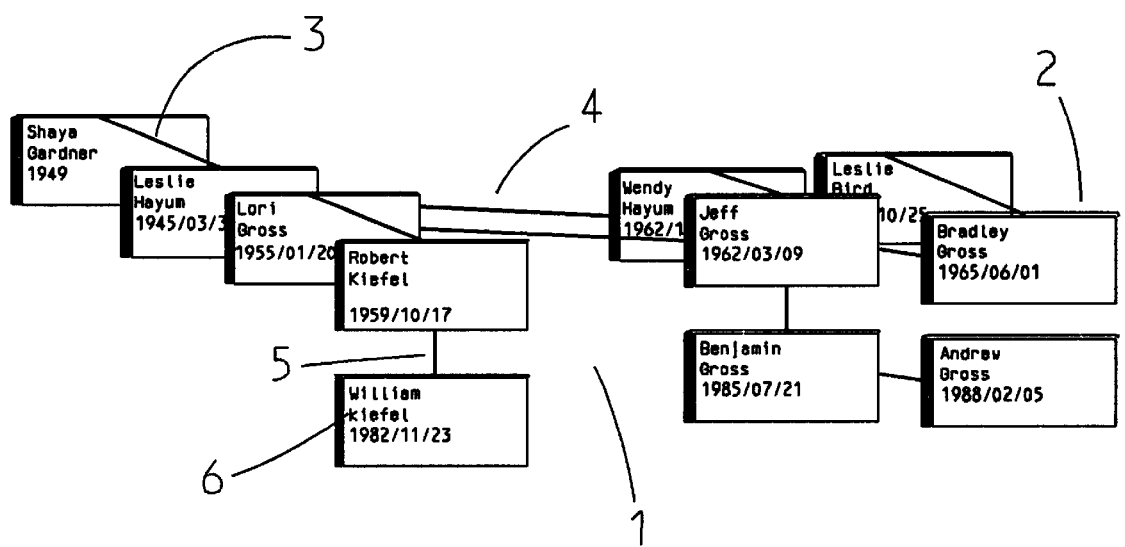
FIG. 1 shows a possible display of a family space with a set of person objects related along various objects.

Turning to FIG. 1, a family space 1 can be seen. Person objects 2 are seen in relation to one another representing part of a family tree. Here, the person objects have been chosen to be rectangular solids with a small thickness. Any two or three dimensional object could be used or selected by the user to be a person object. Also, when a family space such as that shown in FIG. 1 is displayed on a computer screen or computer output device, any color or colors can be used for background, foreground, and objects. Colors can be chosen and changed by the user. In FIG. 1, a relationship 3 is shown along an arbitrary orthogonal axis between two person objects. Depending on the axis, this could be a sibling or marriage relationship, or any other relationship or set of relationships chosen by the user. A relationship 4 on another orthogonal axis can be seen, and a third relationship 5 on a third orthogonal axis can be seen. It should be noted that while normally Cartesian coordinates are used and preferred, any other coordinate system could be used including curvilinear coordinate systems.

Person information 6 can be also seen in FIG. 1. In this example, the name and birthrate can be seen. Any type of information could be displayed about a person object including, but not limited to, history, or a visual likeness of the person (such as a face), an aural or audio representation including the represented person's actual voice, or an aural description of the person which could be spoken or otherwise represented (for example with music).

Figure 2:
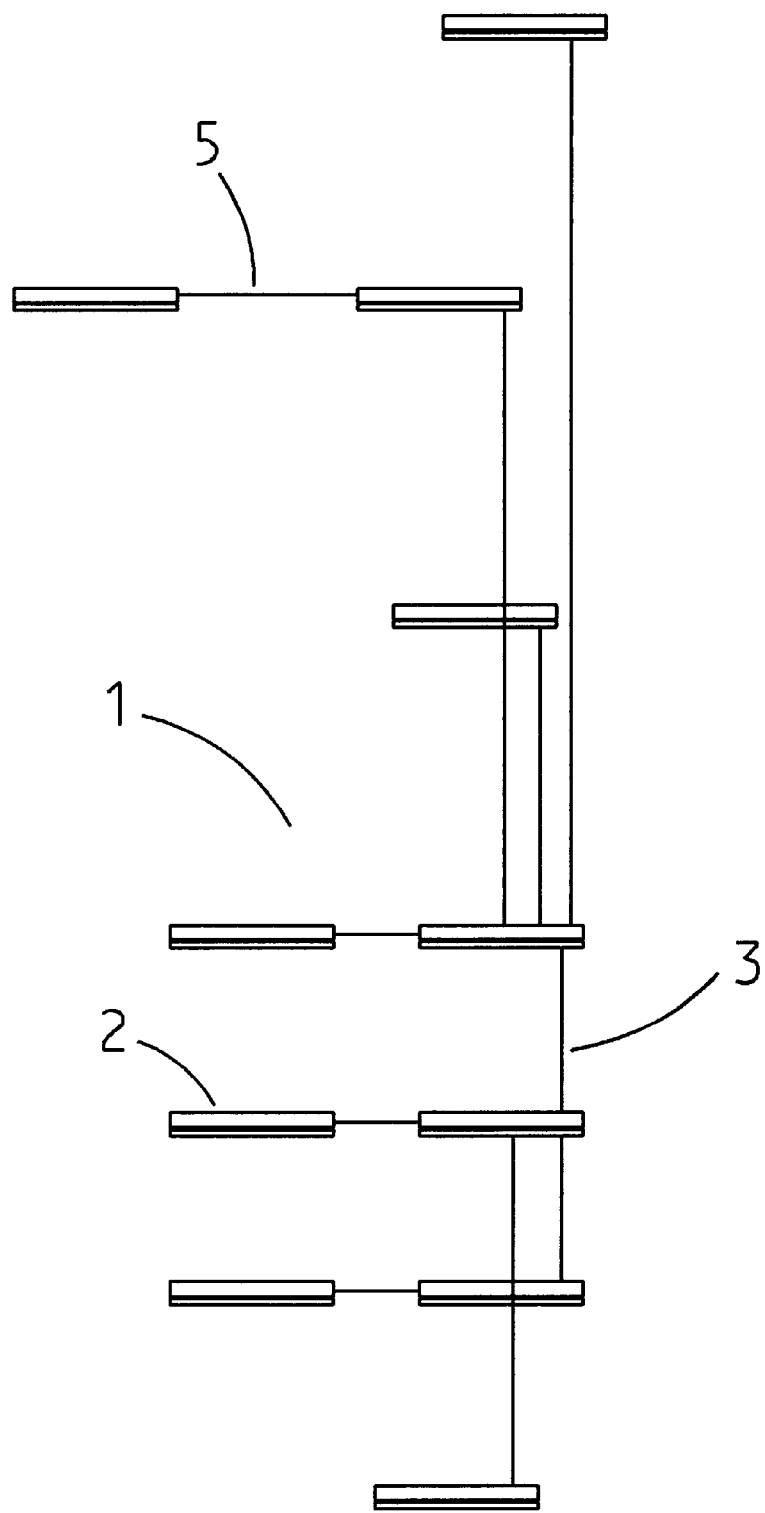
FIG. 2 shows the objects of FIG. 1 from the side.

FIG. 2 shows a side view of the same family space 1 depicted in FIG. 1. The entire display has been rotated to display a view of the person objects 2 from the side. Again, the "look" of the person objects 2 can be changed or-chosen by the user. Relationships between two of the axes 3, 5 can be seen in FIG. 2.

Figure 3:
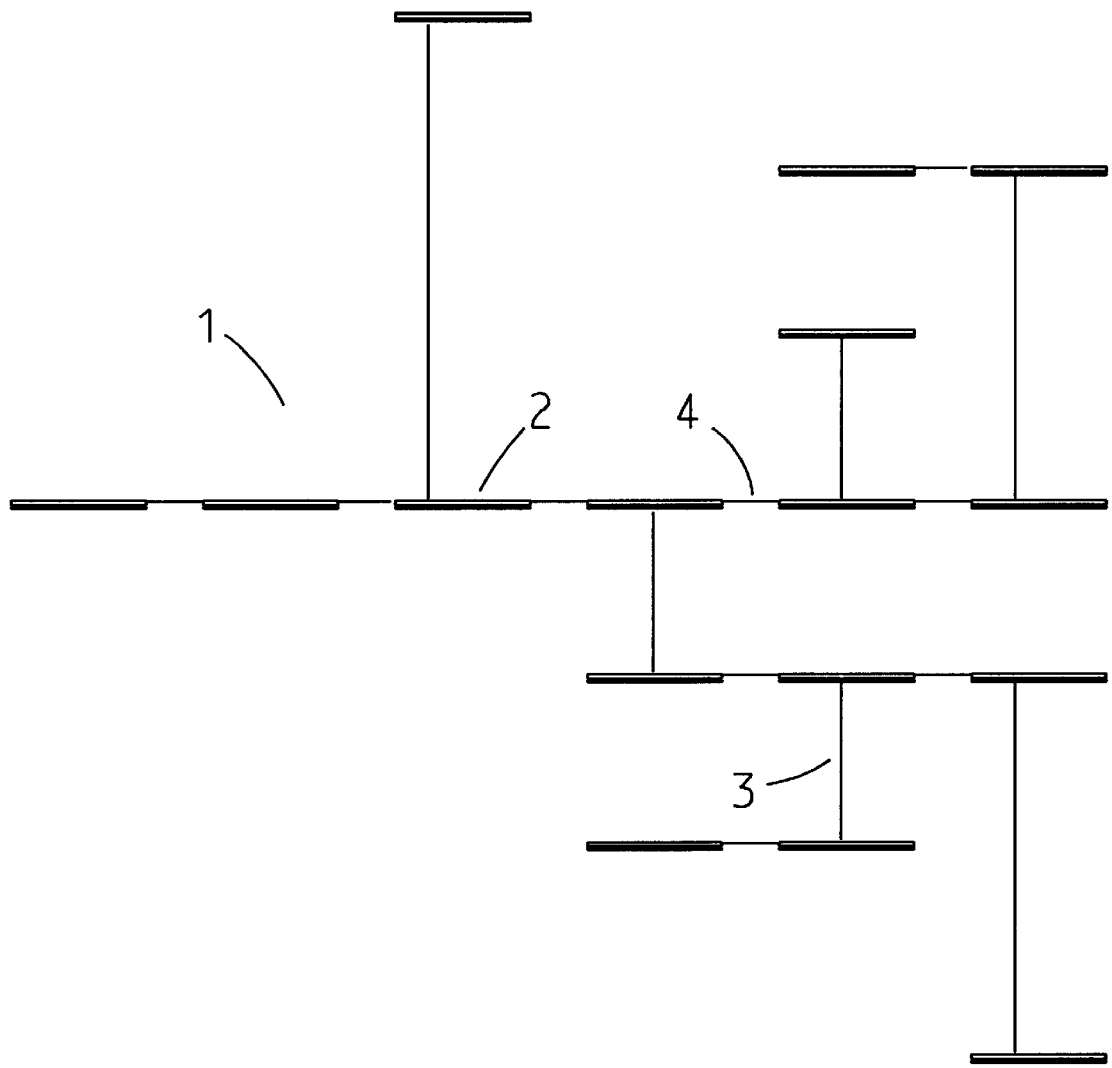
FIG. 3 shows the objects of FIG. 1 from the top.

FIG. 3 shows a top view of the same family space 1 depicted in FIGS. 1 and 2. Again, the person objects 2 can be seen with relations visible on two axes 3, 4. The present invention allows OF the display to be zoomed, rotated about any axis direction, -translated along any axis or set of axes, and otherwise manipulated for easier viewing. It is possible to allow person objects to become transparent to allow easier viewing of objects behind them, and it is possible to allow connections to pass behind or through objects for easier viewing.

Figure 4:
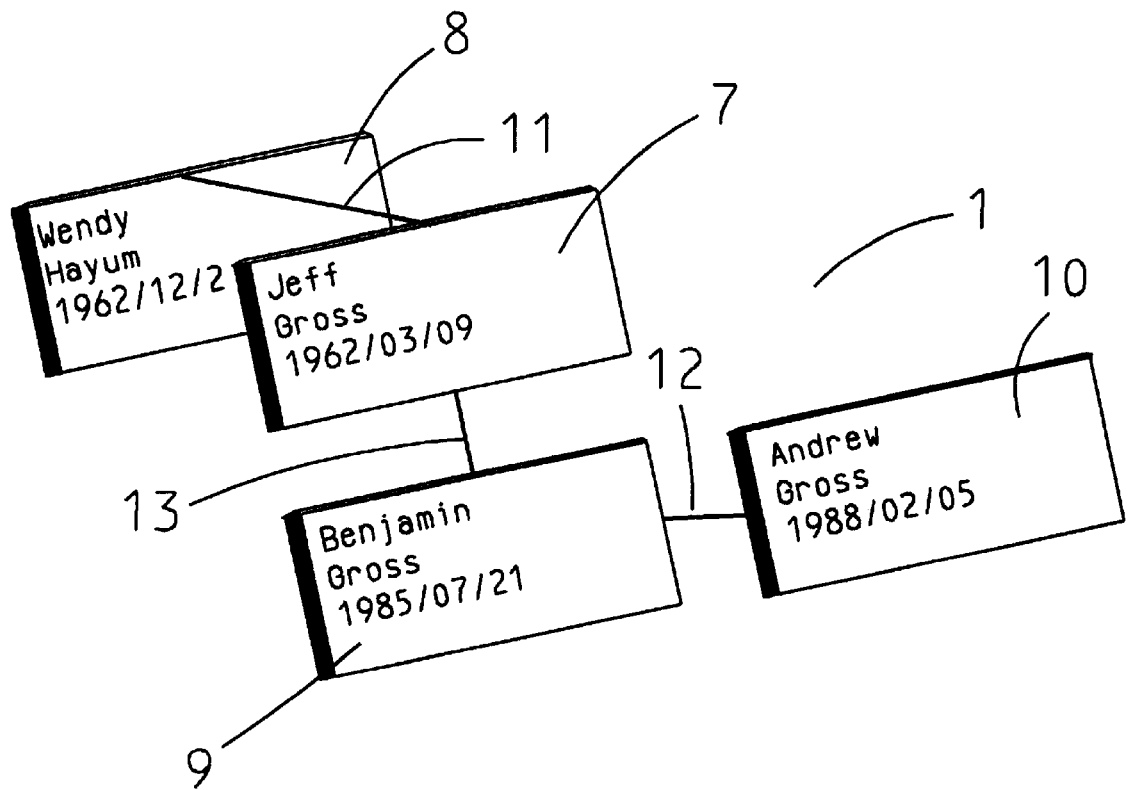
FIGS. 4 shows a set of family objects rotated in a family space.

FIG. 4 shows on rotated view of several person objects about one axis. Rotations of 360 degrees can be made and controlled by the user. It is important to remember that the present invention allows rotation about any axis in finite steps or continuously. Rotation can also be made to take place automatically to provide a changing visual representation of the family space. FIG. 4 shows person objects for four people belonging to a family space 1. In this figures a marriage relationship and parent/child relationships can be seen. In this example, the person object "Jeff" 7 is connected to the person object "Wendy" 8 through a marriage relationship 11 along an axis that can be called the Z axis. The person object "Benjamin" 9 is connected to the person object "Andrew" 10 through a sibling relationship 12 along an orthogonal axis that can be called the X axis. The person object "Jeff" 7 is shown connected to both the person objects "Benjamin" 9 and "Andrew" 10 through parent/child. relationship 13 on a third orthogonal axis that can be called the Y axis. The entire presentation first seen in FIG. 4 is rotated slightly clockwise 1; about the Z axis. The rotation sequence represented by FIG. 4 is a rotation of the starting configuration about the Y axis. The user can easily determine that Jeff and Wendy are married, a and they had children Benjamin and Andrew which are of course siblings.

The present invention includes a set of commands that allow rotation, translation, zooming, mirroring, and any other transformations of the display of the family space on a computer screen. The command set can be based on geometrical or family parameters. Examples of geometrical parameters are degrees of rotation or units of translation, or color changes. Examples of family parameters are the display of adoptive lines, or the change of display from paternal to maternal lines. In general, the command set contains all necessary commands to display the family space in various configurations that allow understanding of the relationships between person objects. Especially important are commands that turn connection lines on or off, and those that can make person objects transparent so that objects behind them can be seen.

Each person object in FIG. 4 contains information about the person. In this example, the person object "Jeff" 7 in contains the first name "Jeff"; the last name "Gross" and the date of birth Mar. 9, 1962. It should be noted that in this particular choice of representation, the person object "Wendy" 8 is shown with a last name of "Hayum" which is her maiden name. She could optionally be represented with a last name of "Gross" which would be her married name; or both names could be shown. It should also be noted that the child/parent connections such as the connection between the person objects "Jeff" 7 and "Benjamin" 9 stem from the father "Jeff"This is an example of the paternal or lineage representation. It is equally possible to use a maternal representation where child/parent connections stem from the mother. It is also possible to optionally use a double representation which shows connections from both the father and the mother.

In some slightly more complex cases, children are adopted or born out of wedlock. It is possible to show adopted type connections between parents and children and to indicate situations where there were adults who parented children who were not married. Divorce and remarriage leads to another possible situation where half sibling relations can be created. It is within the scope of the present invention to show any or all of these relationships at the selection of the user.

The present invention is very useful for showing relationships between cousins of various degree such as first cousins, second cousins, aunt/uncle relationships, and any other type of family relationship.

A The present invention includes a means for tagging, choosing, marking, clicking, or double-clicking a person object to display more information about that person. Any marking or selecting method is within the scope of the present invention. The invention is in no way tied to a particular operating system or computer. It is possible to bring up an entire page, list, window, or other representation containing extensive history or other data about the person. It is possible to connect this list to other such lists for other people by the technique known in the art as hyper-linking. For example, if a user double-clicked on a particular person object in the graphical representation, the user might be presented with a short biography of the person, or more detailed historical information about the person. It is optionally possible to include hyper-links to other persons or person objects in this data. For example, if a biography of the person mentioned that person's father, the father's name could hyper-link to either the father's data, or back to the graph with the graph now centered on the father. The previous data or graph could be stacked or saved so that a return could be made to the original representation.

The present invention, while an abstract data visualization tool, is best embodied on a computer with a display screen or monitor, keyboard, mouse, printer, and other computer input/output devices or projection device. While a printer alone can be used, the preferred method is to use a monitor along with the possible aid of a printer. The present invention allows the printing at any time of any representation of a family space or other data being displayed on a monitor. The preferred system is a personal computer (PC) of the type manufactured by IBM and many other personal computer manufacturers; however, any type of computer or computing device can be used including a mainframe computer, a mini-computer, or a microprocessor. The preferred computer is a personal computer containing a Pentium or equivalent processor manufactured by Intel Corporation. Since the present invention relates to graphics, a graphical or window based system is desirable; however, the present invention can be run under any operating system or stand-alone without an operating system. Possible operating systems could be WINDOWS 95, WINDOWS 98, WINDOWS 2000, DOS, UNIX, LINUX, MACOS, and others (WINDOWS and DOS are registered trademarks of Microsoft Corp.; UNIX and LINUX and MACOS are registered trademarks). Any computer device including embedded computers and microprocessors are within the scope of the present invention. The present invention is not tied to any particular operating system, and could be hard-coded without an operating system.

The present invention, while an abstract data representation tool, can be coded to run on a computer. While any coding method, whether compiled or interpreted, can be used, the preferred language is C++ with DirectX Multimedia environment. The present invention can be stored on a computer in either object form or source form; however, object form is usually necessary for execution. A preferred development tool for the present invention is Visual C++ developed and sold by Microsoft Corp.; however, any developmental tool or workbench can be used to realize the present invention on a specific target processor or computer system.

The type of computer display described can be called a virtual 3-dimensional display. This is because a computer output device is typically a 2-dimensional device. By the use of perspective views, translation, rotation, etc., a 3-dimensional space or display can be simulated. For example connections in a hidden direction can be brought into view by a simple rotation about one of the other directions or axes.

Family data can be entered into the present invention from a database such as GEDCOM, or any other database, or directly from an input device like a keyboard. It can be read or written to stored data files on disk, tape, or any other storage devices. Entire family spaces complete with all relations and data can be stored and retrieved from standard data storage devices known in the art such as computer disks.

While the preferred embodiments of the present invention have been shown and described, it is to be understood that various modifications and changes could be made thereto without departing from the scope of the appended claims.

I claim:

1. A three dimensional computerized genealogical chart comprising:

a family space containing an X axis, a Y axis, a Z axis defining respectively coordinate directions consisting of an X direction, Y direction, and Z direction in said space, said family space containing a set of person objects representing members of a family, said family space and person objects stored in a computer memory;

said person objects connected as siblings in said X direction;

said person objects connected as parents/children in said Y direction;

said person objects connected by marriage in said Z direction;

a view of said family space displayed on a computer output device, said view showing said person objects and said connections between said person objects;

a set of computer commands for controlling said view on said output device according geometrical and family relationships.

2. The computerized genealogical chart as in claim 1 wherein said set of commands includes translation along any of said coordinate directions.

3. The computerized genealogical chart as in claim 1 wherein said set of commands includes rotation about any of said axes.

4. The computerized genealogical chart as in claim 1 wherein said set of commands includes zooming on any of said person objects.

5. The computerized genealogical chart as in claim 1 wherein said person objects display historical information about a person.

6. The computerized genealogical chart as in claim 1 further comprising specific means for identification of a person object, causing said computer output device to display detailed information about a person.

7. The computerized genealogical chart as in claim 6 wherein said means for specific identification of a person object contains a visual likeness of a person.

8. The computerized genealogical chart as in claim 6 wherein said means for specific identification of a person object contains an aural representation or description of a person.

9. The computerized genealogical chart as in claim 1 wherein said computer output device is a computer monitor.

10. A three dimensional computerized genealogical chart comprising:

means for storing a family space in a computer memory, said family space containing an X axis, a Y axis, a Z axis defining respectively coordinate directions consisting of an X direction, Y direction, and Z direction in said space, said family space also containing a set of person objects representing members of a family;

means for connecting said person objects as siblings in said X direction;

means for connecting said person objects as parents/children in said Y direction;

means for connecting said person objects by marriage in said Z direction;

means for providing a view of said family space on a computer output device, said view showing said person objects and said connections between said person objects;

means for controlling said view on said output device according geometrical and family relationships.

11. A three dimensional computerized genealogical chart comprising:

a family space containing an X axis, a Y axis, a Z axis defining respectively coordinate directions consisting of an X direction, Y direction, and Z direction in said space, said family space containing a set of person objects representing members of a family, said family space and person objects stored in a computer memory;

said person objects displaying specific identification and historical information about a person;

said person objects connected as siblings in said X direction;

said person objects connected as parents/children in said Y direction;

said person objects connected by marriage in said Z direction;

a view of said family space displayed on a computer output device, said view showing said person objects and said connections between said person objects;

a set of computer commands for controlling said view on said output device according geometrical and family relationships, said set of computer commands including commands for translation, rotation, and zooming.

12. The computerized genealogical chart as in claim 11 wherein said specific identification displayed by a person object contains a visual likeness of a person.

13. A method for displaying a family tree comprising the steps of:

entering family relation data into a computer, said computer containing a output device;

displaying on said output device geometrical shapes representing persons in said family, said geometrical shapes displaying identification information concerning a person represented;

connecting said geometrical shapes in a virtual 3-dimensional display on said computer screen where different virtual dimensions represent different family relationships;

manipulating said virtual 3-dimensional display with a predetermined set of commands to display different aspects of said family tree.

14. The method for displaying a family tree of claim 13 wherein said predetermined set of commands includes rotation about any axis.

15. The method for displaying a family tree of claim 13 wherein said predetermined set of commands includes translation along any axis.

16. The method for displaying a family tree of claim 13 wherein said predetermined set of commands includes zooming on any of said geometrical shapes.

17. The method for displaying a family tree of claim 13 wherein connections are made along an X axis between geometrical shapes representing siblings.

18. The method for displaying a family tree of claim 13 wherein connections are made along a Y axis between geometrical shapes representing parents/children.

19. The method for displaying a family tree of claim 13 wherein connections are made along a Z axis between geometrical shapes representing marriage.

20. The method for displaying a family tree of claim 13 further comprising causing predetermined subsets of connections between geometrical objects to not be displayed.

* * * * *